UNITED STATES PATENT OFFICE.

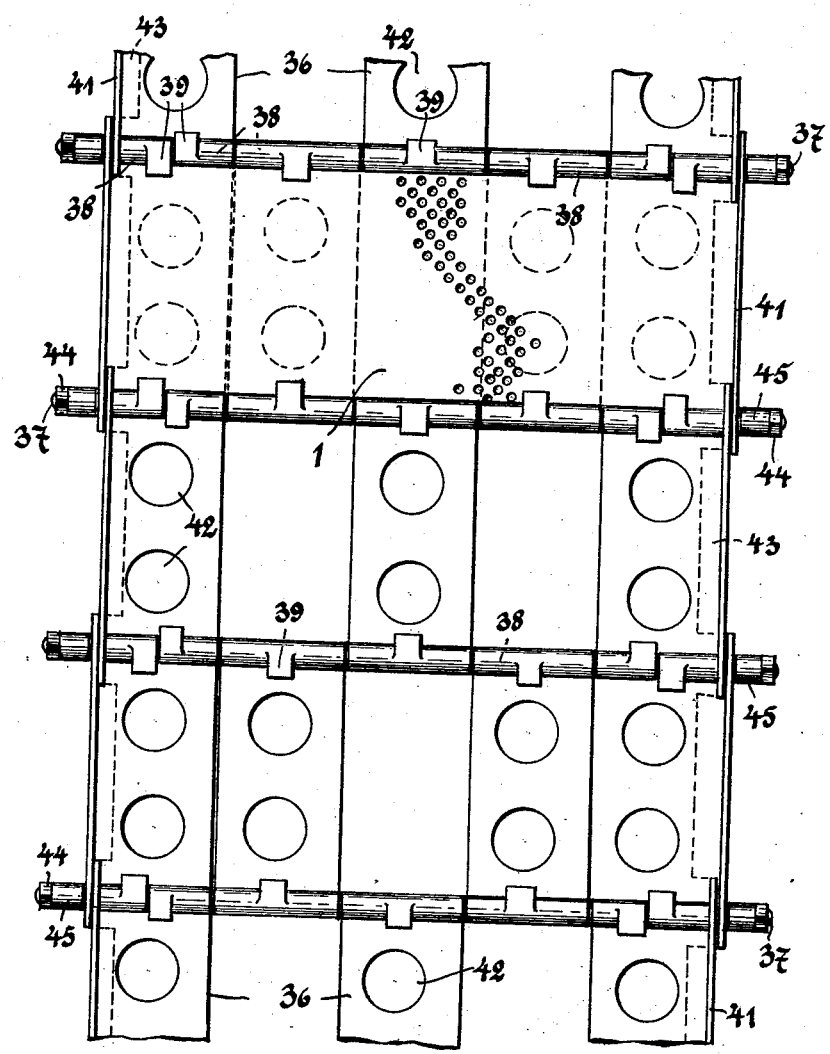

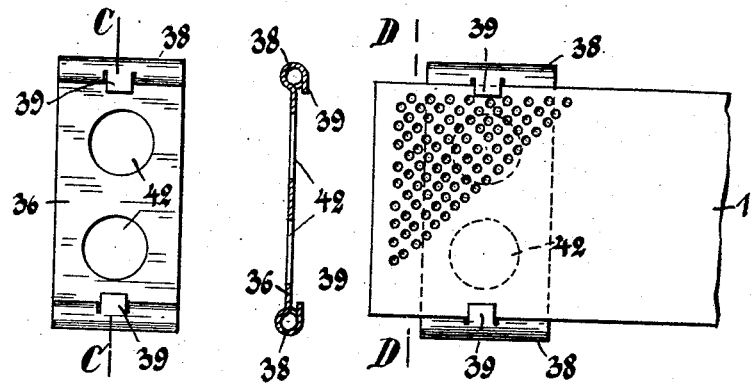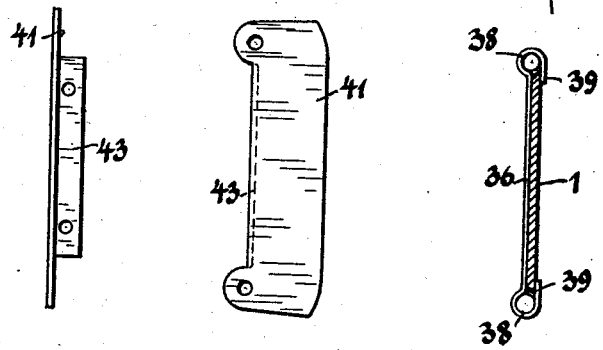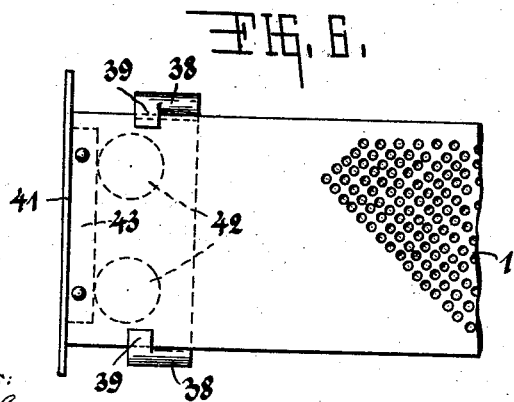

HEINRICH SECK, OF DRESDEN, GERMANY.

CONVEYING APPARATUS.

1,077,918. Specification of Letters Patent. Patented Nov. 4, 1913.

Application filed August 1, 1911. Serial No. 641,742.

*To all whom it may concern:*

Be it known that I, HEINRICH SECK, a subject of the King of Saxony, residing at Dresden, in the Kingdom of Saxony and German Empire, have invented new and useful Improvements in and Relating to Conveying Apparatus, of which the following is a specification.

The invention refers to endless conveyers and has for its object to produce a conveyer of this kind, which shall be simple in construction and shall be capable of being reduced or increased in length and width at will.

To this end, the conveyer according to my invention is composed of individual supporting plates, which are so constructed, that they can be successively hinged together to form an endless carrier. These supporting plates are provided with means for having removably secured to them conveyer plates which may be made of sheet metal, or any other suitable material, and which may be provided with holes or perforations.

The supporting plates are provided at their opposite ends with hinges in such a way that any number of plates can be pivotally connected together lengthwise and sidewise to form an endless conveyer of any desired length or width. The supporting plates along the edges of the conveyer are provided with flanges, projecting above the conveying surface, so as to prevent the material from falling off the conveyer.

In the drawing, Figure 1 shows a portion of my new conveyer in plan view; Figs. 2 and 3 show one of the supporting plates in plan and in section along line C—C in Fig. 2 respectively. Figs. 4 and 5 show one of the supporting plates and part of a conveyer plate in plan and in section along line D—D in Fig. 4 respectively; Fig. 6 shows an outer supporting plate with the retaining flange and part of a conveyer plate; Figs. 7 and 8 show the retaining flange in side elevation and in plan respectively.

The conveyer according to my invention is built up of individual plates. As shown in Fig. 1, the supporting plates 36 are successively hinged together lengthwise and sidewise by means of bolts 37. To this end, each supporting plate is formed at opposite ends with a sleeve 38.

As shown in Fig. 1, the supporting plates 36 are placed side by side, so that the sleeves will be in alinement to permit the hinge bolt 37 to pass through the sleeves. Any number of plates can thus be connected, whereby the width of the conveyer is governed. The plates are also successively arranged lengthwise to form an endless carrier.

As shown in Figs. 2 and 4, incisions are made in the sleeves 38, to permit tongues 39 to be produced, which are bent so as to form a groove 40 together with the face of the supporting plate. Into these grooves 40 the conveyer plates 1 are inserted, so that they can be easily slipped in and out (see Figs. 4 and 5).

The supporting plates 36, which are located along the longitudinal edges of the conveyer, are provided each with a flange 41, projecting above the conveying surface, so as to prevent the material from falling off the conveyer. These flanges 41 are formed on separate pieces 43 (Figs. 7 and 8), which are fastened to the outer edge of the supporting plate 36 by means of rivets, or other suitable means (Fig. 6). The flanges 41 are made of such length that their ends in the finished conveyer will overlap each other (Fig. 1), whereby a continuous guard is formed. The flanges 41 are provided with holes to permit the hinge bolts 37 to be passed through the sleeve 38.

The supporting plates 36 are cut out as at 42, whereby their weight is reduced. The sleeves 38 may extend either over the entire width of the supporting plate (Figs. 2 and 4), or only over a portion thereof (Fig. 6).

The hinge bolts, which are inserted through the sleeves 38, are held in place therein by nuts 44, which are screwed onto the threaded ends of the bolts. Plates which have become damaged can readily be replaced by unscrewing the nuts and withdrawing the bolts 37, which hold the plates together.

Between the nuts and the retaining flanges 41, sleeves 45 can be interposed, as shown in Fig. 1, which sleeves, if desired, may be used in connection with the driving means.

The conveyer plates 1, which may be made of sheet metal, can be provided with holes or perforations, (Figs. 1, 4 and 6), for the purpose of permitting the material, as it is conveyed, to be sorted, or for allowing any liquid to drain off.

I claim:—

1. An endless conveyer, comprising individual supporting plates with hinges formed thereon at opposite ends, means for successively connecting a plurality of such plates, tongues produced on said hinges and forming grooves together with the supporting plates, and conveyer plates adapted to be inserted into and removed from said grooves.

2. An endless conveyer comprising a plurality of individual supporting plates adapted to be successively hinged together to form an endless carrier, conveyer plates removably held in place on said supporting plates and retaining flanges secured to the longitudinal edges of the outside supporting plates.

3. An endless conveyer, comprising a plurality of individual supporting plates with hinges formed thereon at opposite ends, means for pivotally connecting said supporting plates lengthwise and sidewise to form an endless carrier, and retaining flanges secured to the longitudinal edges of the outside supporting plates with their ends overlapping each other.

4. An endless conveyer, comprising a plurality of individual supporting plates with hinges formed thereon at opposite ends, means for pivotally connecting said supporting plates lengthwise and sidewise to form an endless carrier, and retaining flanges secured to the longitudinal edges of the outside supporting plates with their ends overlapping each other, and conveyer plates removably held by said supporting plates and composed of perforated sheet metal.

In testimony whereof I have signed my name to this specification in the presence of two subscribing witnesses.

HEINRICH SECK.

Witnesses:
BERNHARD GRAETZ,
RICHARD KINDLER.

---

Copies of this patent may be obtained for five cents each, by addressing the "Commissioner of Patents, Washington, D. C."